Figure 1:
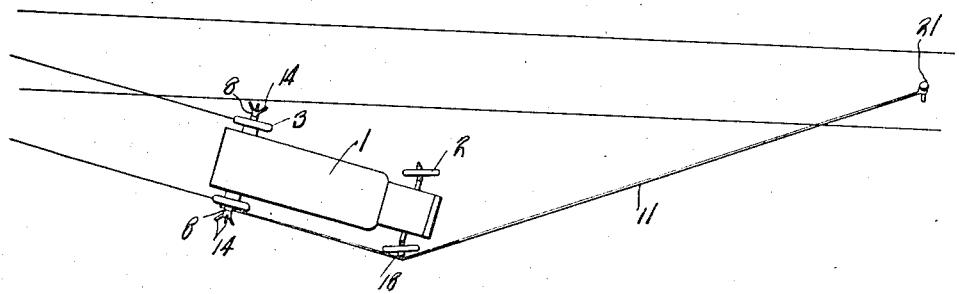

J. C. CALDWELL & A. H. ADAMS.
AUTOMOBILE PULLER.
APPLICATION FILED DEC. 19, 1917.

1,290,077.

Patented Jan. 7, 1919.

WITNESSES
W. E. Fielding.
Irving L. McGathran

INVENTOR
John C. Caldwell
and Augustus H. Adams

ATTORNEY

UNITED STATES PATENT OFFICE.

JOHN C. CALDWELL AND AUGUSTUS H. ADAMS, OF MIAMI, FLORIDA.

AUTOMOBILE-PULLER.

1,290,077.   Specification of Letters Patent.   Patented Jan. 7, 1919.

Application filed December 19, 1917. Serial No. 207,957.

*To all whom it may concern:*

Be it known that we, JOHN C. CALDWELL and AUGUSTUS H. ADAMS, citizens of the United States, residing at Miami, in the county of Dade and State of Florida, have invented certain new and useful Improvements in Automobile-Pullers, of which the following is a specification.

This invention relates to an emergency draft appliance for automobiles and has for its object the production of a strong and inexpensive attachment for an automobile which will permit the vehicle to advance when the driving wheels are unable to obtain a tractive action, for the purpose of drawing the vehicle out of mud holes, sand pits and the like under its own power.

Another object of this invention is the production of a simple and efficient winding drum, which is provided with means for preventing the draft cable from accidentally jumping from the drum.

With these and other objects in view, this invention consists of certain novel constructions, combinations and arrangements of parts as will be hereinafter fully described and claimed.

In the drawings:—

Figure 2:
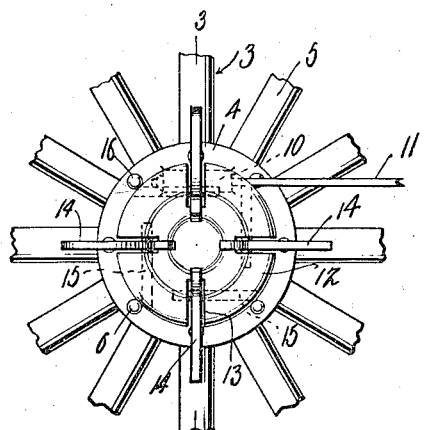
Figure 3:
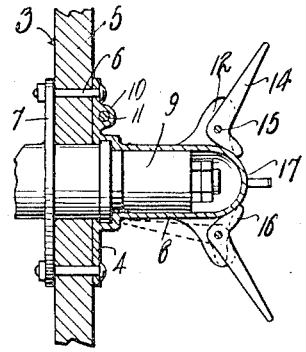
Figure 4:
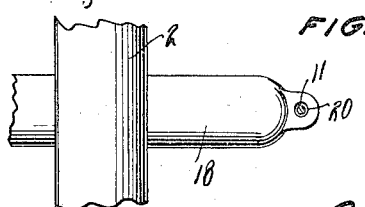

Figure 1 is a top plan view of a vehicle showing the draft means applied thereto, Fig. 2 is an end elevation of the winding drum, Fig. 3 is a section taken on line 3—3 of Fig. 2, Fig. 4 is a top plan view of the guiding drum carried by the forward wheel.

By referring to the drawings, it will be seen that 1 designates the body of an automobile which is provided with a pair of forward steering wheels 2 and a pair of rear driving wheels 3. Each driving wheel 3 carries a hub plate 4 which hub plate is secured to the spokes 5 of the wheel 3 by means of suitable bolts 6, these bolts 6 also passing through the opposite clamping plate 7. The hub plate 4 is provided with a drum 8 which drum 8 fits over the outer end of the axle 9 as shown in Fig. 3 of the drawing. The plate 4 is also provided with a socket 10 extending transversely across the same and this socket 10 is adapted to receive a flexible draft means such as a cable and the like for firmly holding the cable in engagement with the plate 4. This cable may be secured or held within a socket 10 by any suitable or desired means.

The drum 8 is provided with a flared outer end constituting a rim 12 which rim 12 is provided with notches 13, within which notches 13 are pivotally mounted the cable retaining arms 14, these arms 14 being pivotally mounted upon a supporting pin 15. Each of the arms 14 is provided with an angularly extending end or foot 16 which extends outwardly with respect to the drum 8 and is adapted to rest upon the rounded end 17 of the drum 8, which rounded end constitutes a knob. It will be seen that these angularly extending ends 16 will limit the outward swing of the arms 14 and hold the same in an extended position for preventing the cable 11 from accidentally falling off of the drum 8. If it is desired, however, the arms 14 may be swung flat upon the body of the drum 8 as shown in dotted lines, this being the position assumed by the arms 14 while the device is not in operation.

The axle of each front wheel 2 carries a loosely mounted sleeve 18 at the outer end thereof and this sleeve 18 is provided with a projecting ear 19 having an aperture 20 formed therein, through which aperture 20 extends the draft cable 11, in this manner constituting a guide for the draft cable 11 as the same passes across a front wheel 2 of the vehicle 1 as shown in Fig. 1 of the drawing. An anchoring pin 21 is adapted to be driven into the ground in advance of the automobile and the outer end of the draft cable 11 is secured to this anchoring pin 21.

From the foregoing description and by considering the drawing, it will be seen that a very simple and efficient device has been produced for drawing an automobile out of a mud hole, sand pit or ditch by means of a draft cable which is wound around a drum supported upon the driving wheels of a vehicle. It should also be understood that a simple and efficient means has been produced which may be very easily and readily attached to any form of a vehicle without materially changing the construction of the device.

It should be of course understood that certain obvious detail mechanical changes may be made in the present device without departing from the spirit of the invention, so long as these changes fall within the scope of the appended claims.

By considering the drawings, it will be seen that the drum 8 and plate 4 constitute an efficient hub for the wheel which supports the same.

What is claimed is:—

1. A draft appliance for use in connection with vehicles comprising a drum, means for securing said drum to a wheel, said drum provided with a flange upon the outer end thereof, a rounded end projecting centrally from said drum and flange, said flange provided with a plurality of notches formed therein, cable retaining arms pivotally mounted within said notches and having radiating ends projecting from said flange, each arm provided with an angularly extending foot adapted to rest upon said rounded end of said drum for limiting outward swinging movement of said arms when pressure is brought to bear thereon.

2. A draft appliance especially adapted for use in connection with automobiles comprising a drum, means for attaching said drum to a wheel, an annular flange carried near the outer end of said drum, said drum provided with a rounded outer end arranged centrally of said flange, said flange provided with spaced notches formed in the periphery thereof, and pivotally cable retaining arms carried within said notches and provided with means for engaging the outer end of said drum for limiting the swinging movement of said arms in one direction.

In testimony whereof we affix our signatures in presence of two witnesses.

JOHN C. CALDWELL.
AUGUSTUS H. ADAMS.

Witnesses:
J. EDWARD LIND,
J. C. TUCKER,

Copies of this patent may be obtained for five cents each, by addressing the "Commissioner of Patents, Washington, D. C."